United States Patent [19]

Shire

[11] Patent Number: 5,150,528
[45] Date of Patent: Sep. 29, 1992

[54] SCOPE COVER

[75] Inventor: Michael H. Shire, Belgrade, Mont.

[73] Assignee: Quake Industries, Inc., Belgrade, Mont.

[21] Appl. No.: 675,530

[22] Filed: Mar. 25, 1991

[51] Int. Cl.⁵ .................. G02B 23/16; F41A 35/02
[52] U.S. Cl. ........................ 33/244; 359/511; 220/375
[58] Field of Search .............. 33/244, 245, 246, 247, 33/248, 242; 350/582, 587; 359/808, 507, 511; 220/375, 379, 305, 339; 215/306

[56] References Cited

U.S. PATENT DOCUMENTS

| | | | |
|---|---|---|---|
| 1,650,517 | 11/1927 | Hughes | 215/306 |
| 1,683,106 | 9/1928 | Schrank | 33/242 |
| 2,488,188 | 11/1949 | Halvorson | 33/244 |
| 2,696,672 | 12/1954 | Durfee | 33/244 |
| 2,849,795 | 9/1958 | Vissing | 33/244 |
| 3,426,433 | 2/1969 | Anderson | 33/245 |
| 3,496,642 | 2/1970 | Pfahler | 33/244 |
| 3,831,285 | 8/1974 | Vissing | 33/244 |
| 4,327,960 | 5/1982 | Gould | 350/587 |

FOREIGN PATENT DOCUMENTS 2296863  7/1976  France ........................ 350/587

OTHER PUBLICATIONS

Washington Post and Times Herald, Dec. 1, 1957, p. C7, E. Dodd.

*Primary Examiner*—William A. Cuchlinski, Jr.
*Assistant Examiner*—Alvin Wirthlin
*Attorney, Agent, or Firm*—Zarley, McKee, Thomte, Voorhees & Sease

[57] ABSTRACT

A scope cover comprising a resilient mounting ring which is positioned on a rifle scope or the like and which has a pair of resilient attachment bands secured thereto and which extend therefrom to a resilient cover which may be stretched over one end of the scope to protect the same when the scope is not being used. When the cover is removed from one of the scope, the attachment bands maintain the cover closely adjacent the upper portion of the scope to prevent the cover from becoming entangled in the firearm's action or entangled in brush.

2 Claims, 1 Drawing Sheet

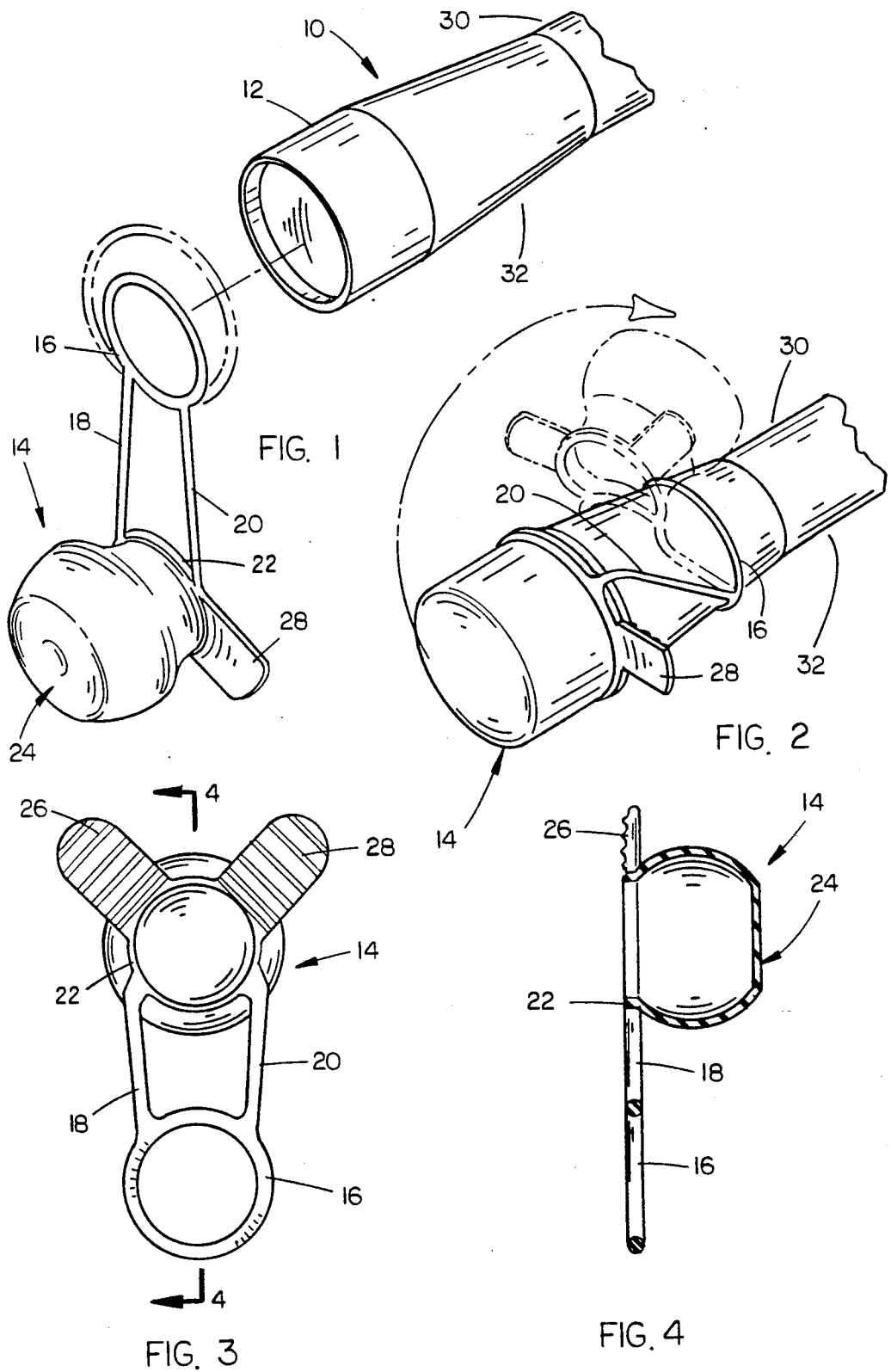

5,150,528

SCOPE COVER

BACKGROUND OF THE INVENTION

This invention relates to a scope cover and more particuarly to a scope cover which may be used on rifle scopes, binoculars and spotting scopes.

Many types of scope covers have been previously provided which are designed to protect the ocular and/or objective ends of the scopes when the scope is not actually being used. One type of prior art cover is simply a resilient cup-shaped cover which is stretched over one end of the scope to protect the lens when the scope is not actually being used. In this type of device, the cover may become lost when it has been removed from the scope.

To overcome the loss problem, another prior art device utilized flexible straps which extended between the cover and a mounting strap positioned on the scope. Although the flexible straps did prevent the cover from becoming lost when removed from the scope, the flexible straps also caused the cover to become tangled in the firearm's action and on brush.

It is therefore a principle object of the invention to provide an improved scope cover.

It is yet another object of the invention to provide an improved scope cover which may be used on rifle scopes, teleopes or spotting scopes.

Still another object of the invention is to provide a scope cover including a unique attachment means which insures that the cover will not become entangled in the firearm's action or on brush.

Still another object of the invention is to provide a scope cover having a unique attachment system which maintains the cover closely adjacent the upper portion of the scope when the cover has been removed from one end thereof.

Yet another object of the invention is to provide a scope of the type described which is economical of manufacture, durable in use and refined in appearance.

These and other objects will be apparent to those skilled in the art.

BRIEF DESCRIPTION OF THE DRAWINGS

FIG. 1 is a perspective view illustrating the first step in mounting the cover of this invention on a scope;

FIG. 2 illustrates the cover in its operative position with the broken lines illustrating the cover in its inoperative position;

FIG. 3 is a front elevational view of the cover; and

FIG. 4 is a sectional view of the cover as seen on lines 4—4 of FIG. 3.

SUMMARY OF THE INVENTION

A scope cover is described which may be used on a rifle telescope, binoculars or shooting scope. The cover of this invention includes a resilient mounting ring which may be stretched and positioned around the scope adjacent one end thereof. A pair of resilient attachment bands extend from the mounting ring to a cup-shaped cover. The cover has a pair of tabs extending therefrom to enable the cover to be stretched over one end of the scope and to be easily removed therefrom. The positioning of the attachment bands relative to the mounting ring and the cover is such that the cover will be positioned closely adjacent the upper portion of the scope when the cover is removed from one end of the scope to enable the scope to be used.

DESCRIPTION OF THE PREFERRED EMBODIMENT

In the drawings, the numeral 10 generally refers to a scope which may be either a rifle scope, binoculars or a shooting scope. For the purposes of this description, the scope 10 will be described as being a rifle scope having an ocular end 12. The scope cover of this invention is referred to generally by the reference numeral 14 and which is comprised of an integral, one-piece molded rubber or the like construction.

Scope cover 14 includes a resilient mounting ring 16 having a pair of resilient attachment bands 18 and 20 extending therefrom in the same plane as the plane of the ring 16 and which diverge slightly outwardly as they extend from the mounting ring 16. The other ends of the attachment bands 18 and 20 are secured to the inner end 22 of a resilient, cup-shaped cover 24 having a hollow interior. As seen in FIG. 3, bands 18 and 20 are attached to the inner end 22 in a radial-like fashion. A pair of spaced-apart tabs 26 and 28 extend radially outwardly from inner end 22 of cover 24 to enable the convenient positioning of the cover 24 on the end of the scope and to permit the convenient removal therefrom.

For purposes of description, scope 10 will be described as having an upper end 30 and lower end 32. Scope cover 14 is initially positioned with respect to scope 10 as illustrated in FIG. 1 with the attachment bands 18 and 20 extending downwardly from ring 16 and with the inner open-end 22 of cover 24 facing towards the other end of the scope 10. Bands 18 and 20 are then stretched and the cup-shaped member 24 is positioned at the upper end of the scope 10 inwardly from the end thereof as illustrated by broken lines in FIG. 2. When it is desired to position the cup-shaped member 24 on the end of the scope, the tabs 26 and 28 are grasped and the cover is stretched over the end of the scope as illustrated in FIG. 2. When it is desired to remove the cover from the scope, either of the tabs 26 and 28 may be grasped to remove the cup-shaped cover 24 from the end of the scope and to reposition the device on top of the scope as illustrated by broken lines in FIG. 2. In such a position, the bands 18 and 20 maintain the cup-shaped member 24 closely adjacent the upper end 30 of the scope 10 so that the device will not become entangled in the firearm's action and will not become entangled in brush. The mounting of the attachment bands to the mounting ring and the cover 24 together with the resiliency of the bands 18 and 20 ensure that the device will be properly positioned in both its operative and inoperative positions.

Thus it can be seen that the invention accomplishes at least all of its stated objectives.

I claim:

1. A scope cover for a scope having opposite ends comprising, a resilient attachment ring;

a pair of spaced-apart, resilient attachment bands extending from said ring in substantially the same plane as said ring, a resilient, cup-shaped cover means having an inner open-end and outer end, said bands being secured to the inner end of said cover means, said ring having sufficient resiliency to permit it to be stretched and positioned around one end of the scope, said cover means having sufficient resiliency to permit it to be stretched and positioned over said one end of the scope, said bands of such a length and resiliency and located to permit said cover means to be stretched and moved away from said attachment ring so that said cover means may be positioned on top of the scope and in engagement therewith adjacent to said one end, said bands extending downwardly from said ring, when said ring is mounted on the scope, and are bent upwardly from the ring when the cover means is placed in an inoperative position on top of the scope.

2. In combination:

a scope having an ocular end, an opposing second end, an upper side and a lower side; and a scope cover removably connected to said scope for operable movement between an operative position covering said ocular end, and a nonoperative position on top of and in engagement with the upper side of the scope;

said scope cover comprising:
  a resilient attachment ring resiliently stretched and positioned around the ocular end of said scope;
  a pair of spaced-apart, resilient attachment bands extending from a lower portion of said ring;
  a resilient, cup-shaped cover means having an inner open end and an outer end, connected at its inner end to said bands;
  said cover means having sufficient resiliency to permit it to be stretched and positioned in an operative position over the ocular end of said scope;
  said bands having sufficient resiliency to permit said cover means to be stretched and moved away from said attachment ring so that said cover means may be positioned on top of the scope and in engagement therewith adjacent said one end when in its inoperative position,
  said bands being positioned and having a length such that the cover means will be resiliently biased against the upper side of said scope when in said inoperative position.

* * * * *